E. H. & S. D. PERKINS.
CULTIVATOR.

No. 186,611. Patented Jan. 23, 1877.

WITNESSES:
Francis McArdle.
John Goethals

INVENTOR:
E. H. Perkins
BY S. D. Perkins
ATTORNEYS.

UNITED STATES PATENT OFFICE.

ELIJAH H. PERKINS AND SOLOMON D. PERKINS, OF VISALIA, CALIFORNIA.

IMPROVEMENT IN CULTIVATORS.

Specification forming part of Letters Patent No. 186,611, dated January 23, 1877; application filed June 6, 1876.

*To all whom it may concern:*

Figure 1:
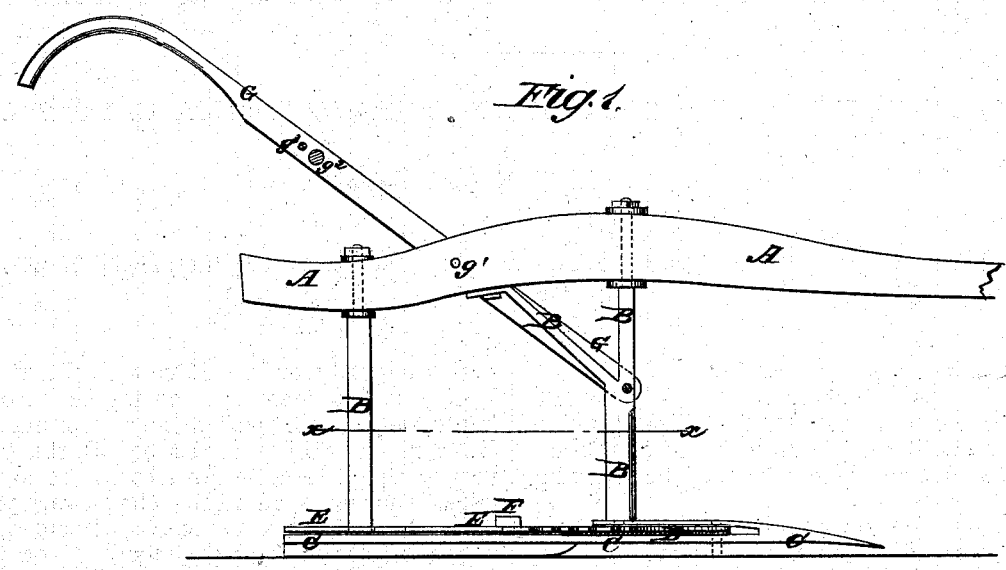
Figure 2:
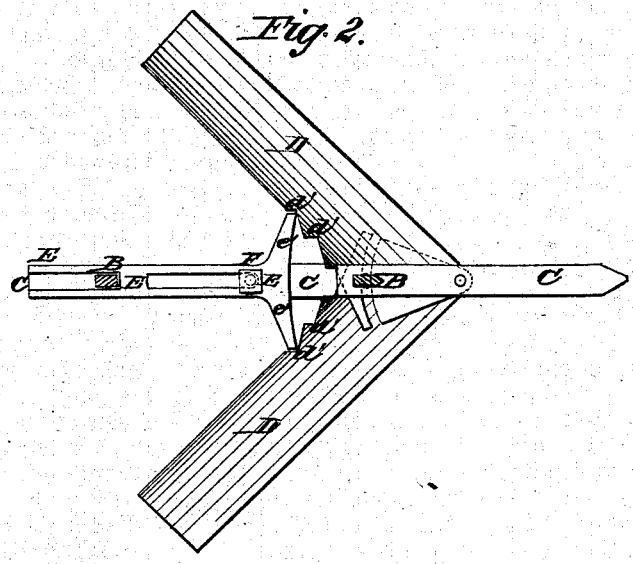

Be it known that we, ELIJAH H. PERKINS and SOLOMON D. PERKINS, of Visalia, Tulare county, California, have invented a new and Improved Cultivator, of which the following is a specification:

Figure 1 is a side view of our improved cultivator, one of the handles being removed, and Fig. 2 is a horizontal section of the same, taken through line $x\ x$, Fig. 1.

Similar letters of reference indicate corresponding parts.

The object of this invention is to furnish an improved machine for cutting the weeds beneath the surface of the ground in cultivating plants so small as not to require soil to be thrown around them, which shall be so constructed that it may be expanded and contracted for cultivating rows of plants of different widths.

The invention will first be described in connection with the drawing, and then pointed out in the claims.

A is the plow-beam, to the rear part of which are attached the upper ends of two standards, B. To the lower ends of the standards B is attached the foot C, upon the lower side of which is formed a longitudinal rib or flange, to give the machine steadiness of motion, and make it more easily guided. The forward part of the foot C is made thicker, and is slotted longitudinally from its shoulder. D are the wings or cutters, the inner ends of which overlap each other within the slot of the foot C, and are pivoted at the forward corners of said inner ends to said foot.

The inner ends of the wings D have curved slots formed in them to receive the lower part of the forward standard B, so that the wings D may be extended and contracted, according to the distance apart of the rows of plants. Upon the foot C is placed a bar, E, the rear part of which is slotted to receive the lower part of the rear standard B. The forward part of the bar E is slotted to receive the bolt F, by which it is secured to said foot. Upon the forward end of the bar E is formed a cross-head, $e'$, the ends of which enter notches $d'$ in the inner edges of the forward parts of wings D, as shown in Fig. 2. Several notches $d'$ are formed in the edges of the wings D, to receive the ends of cross-head $e'$, to support the said wings when extended more or less. The bar E is locked in place, when adjusted, by tightening the nut of the bolt F. G are the handles, the lower ends of which are bolted to the forward standard B. The handles G are connected with the rear part of the beam A by a round, $g^1$, and their upper parts are connected together by a round, $g^2$, and long bolt $g^3$, either or both.

Having thus described our invention, we claim as new and desire to secure by Letters Patent—

1. A pair of cutter-wings, D D, made to overlap each other within a slot of foot C, as and for the purpose set forth.

2. The slotted adjustable bar E, having cross-head $e'$, in combination with wings D, having notches $d'$, as and for the purpose specified.

ELIJAH HENRY PERKINS.
SOLOMON DAVID PERKINS.

Witnesses:
G. LYTLE,
J. W. CROWLEY